United States Patent
Chang

(10) Patent No.: US 6,734,267 B2
(45) Date of Patent: May 11, 2004

(54) POLYMERIZATION CATALYST SYSTEMS, THEIR PRODUCTION AND USE

(75) Inventor: Main Chang, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/430,962

(22) Filed: May 6, 2003

(65) Prior Publication Data

US 2003/0199390 A1 Oct. 23, 2003

Related U.S. Application Data

(62) Division of application No. 08/816,466, filed on Mar. 13, 1997, now Pat. No. 6,605,560, which is a continuation of application No. 08/356,425, filed on Dec. 15, 1994, now abandoned.

(51) Int. Cl.$^7$ ................................................... C08F 4/44
(52) U.S. Cl. ........................................ 526/160; 526/943
(58) Field of Search ................................. 526/160, 943

(56) References Cited

U.S. PATENT DOCUMENTS

| | | | | |
|---|---|---|---|---|
| 4,246,134 A | | 1/1981 | Uvarov et al. ............... 526/141 |
| 4,433,082 A | * | 2/1984 | Grot ............................ 524/755 |
| 4,650,778 A | * | 3/1987 | Klabunde et al. ........... 502/523 |
| 4,778,605 A | * | 10/1988 | Anthoney et al. .......... 502/107 |
| 4,939,217 A | | 7/1990 | Stricklen .................... 502/113 |
| 5,057,475 A | * | 10/1991 | Canich et al. .............. 502/104 |
| 5,332,706 A | | 7/1994 | Nowlin et al. |
| 5,466,649 A | * | 11/1995 | Jejelowo .................... 502/120 |
| 5,658,840 A | * | 8/1997 | Kolle et al. ................. 502/104 |
| 5,665,665 A | * | 9/1997 | Brinen et al. ................. 502/9 |
| 6,605,560 B1 | * | 8/2003 | Chang ........................ 502/104 |

FOREIGN PATENT DOCUMENTS

| EP | 0 545 152 A1 | 6/1993 |
|---|---|---|
| EP | 0 563 917 B1 | 10/1993 |
| WO | 94/28034 | 12/1994 |

* cited by examiner

Primary Examiner—Helene Klemanski
Assistant Examiner—J. Pasterczyk
(74) Attorney, Agent, or Firm—Jaimes Sher; Kevin M. Faulkner

(57) ABSTRACT

This invention is generally directed toward a supported catalyst system useful for polymerizing olefins. The method for supporting the catalyst of the invention provides for a supported metallocene catalyst formed by vacuum or pressurized impregnation.

18 Claims, No Drawings

POLYMERIZATION CATALYST SYSTEMS, THEIR PRODUCTION AND USE

RELATED APPLICATION DATA

The present application is a divisional of U.S. patent application Ser. No. 08/816,466, filed Mar. 13, 1997, now issued as U.S. Pat. No. 6,605,560, which is a continuation of U.S. Ser. No. 08/356,425, filed Dec. 15, 1994, now abandoned.

FIELD OF THE INVENTION

This invention relates to catalysts, catalyst systems and to methods for their production and use in olefin polymerization. The invention particularly relates to process for preparing a supported metallocene catalyst system.

BACKGROUND OF THE INVENTION

It is well known in the art that metallocene catalysts and catalyst systems are quite soluble in many liquids, particularly those diluents or reactive components used in a typical olefin polymerization processes. In addition, metallocene catalysts can also be affected chemically and physically by various components typically used in a commercial polymerization process. Metallocene catalyst components and catalyst system components have a tendency toward fouling and/or sheeting in a gas phase and slurry polymerization processes. In a continuous gas phase process, in particular, fouling on the walls of the reactor, can result in many problems including poor heat transfer in the polymerization process. Polymer particles that adhere to the walls of the reactor continue to polymerize and often fuse together and form chunks, which can be detrimental to a continuous process, particularly a fluidized bed process. In a continuous slurry process fouling on the walls of the reactor, which act as the heat transfer surface, can result in many problems including poor heat transfer. In addition these catalysts often provide polymer products that are low in bulk density and therefore are difficult to handle and transfer.

As a result of the reactor operability issues associated with using metallocene catalysts and catalyst systems various techniques for supporting or producing a metallocene catalyst system with reduced tendencies for fouling have been developed. For example, U.S. Pat. No. 5,283,278 is directed towards the prepolymerization of a metallocene catalyst. U.S. Pat. No. 5,332,706 describes a method for forming a support metallocene catalyst using an incipient impregnation technique where a very small volume of solution is mixed with a silica support. While these possible solution might reduce fouling or sheeting somewhat, it is expensive to employ and may not reduce both fouling and sheeting to a level sufficient for the successful operation of a continuous process, particularly a commercial or large-scale process.

Thus, it would be highly advantageous to have an improved polymerization catalyst that in a polymerization process would significantly enhance reactor operability.

SUMMARY OF THE INVENTION

This invention is generally directed towards a new polymerization catalyst system, to methods for its manufacture and to its use in a polymerization process.

In one embodiment a method is provided to produce a supported catalyst system by contacting a carrier, a metallocene catalyst component and an activator in a vacuum. The supported catalyst is then brought to ambient pressure for use as a polymerization catalyst.

In an alternative embodiment, a method for producing a supported catalyst system is provided where the supported catalyst system is produced in a vessel having a starting pressure, the pressure is then increased above the starting pressure during or after contacting a carrier with a liquid. The liquid may comprise a metallocene catalyst component or an activator or both.

In another embodiment of the invention, there is provided a process for producing polyolefins by contacting olefin monomer, optionally with at least one comonomer in the presence of the catalyst system described above.

In yet another embodiment there is provided a catalyst system produced by the improved method.

DETAILED DESCRIPTION OF THE INVENTION

Introduction

This invention is generally directed toward the formation of a supported catalyst system useful for polymerizing olefins. It is known in the art that catalyst can be vacuum dried after formation. This invention relates to the formation of a supported catalyst system under a vacuum. The invention also relates to the formation of a supported catalyst system where during application of the catalyst bearing solvent to the carrier or after the formation of supported catalyst system, the supported catalyst system is subjected to an environment creating a pressure differential from the outside to the inside of the particles of the supported catalyst system. The method for forming the catalyst system of the invention results in a polymerization catalyst with reduced fouling tendencies resulting in improved reactor operability.

Making the catalyst of the invention as described above results in a simple, commercially useful and cost effective supported catalyst system with a reduced tendency for sheeting or fouling in a polymerization reactor without a reduction in catalytic activity.

Catalyst Components and Catalyst Systems of the Invention

Metallocene catalysts, for example, are typically those bulky ligand transition metal compounds derivable from the formula:

$[L]_m M[A]_n$ where L is a bulky ligand; A is leaving group or a univalent anionic ligand, M is a transition metal and m and n are such that the total ligand valency corresponds to the transition metal valency. Preferably the catalyst is four co-ordinate such that the compound is ionizable to a $1^+$ charge state.

If two ligands L are present they may be bridged. The metallocene compound may be full-sandwich compounds having two or more ligands L, which may be cyclopentadienyl ligands or cyclopentadiene derived ligands, or half-sandwich compounds having one ligand L, which is a cyclopentadienyl ligand or derived ligand.

In one embodiment, at least one ligand L has a multiplicity of bonded atoms, preferably 4 to 30 carbon atoms, that typically is a cyclic structure or ring system such as a ligand, which may be substituted or unsubstituted. Non-limiting examples of ligands include a cyclopentadienyl ligand, or a cyclopentadienyl derived ligand such as an indenyl ligand, a benzindenyl ligand or a fluorenyl ligand and the like or any other ligand capable of η-5 bonding to a transition metal atom. One or more of these bulky ligands may be π-bonded to the transition metal atom. The transition metal atom may be a Group 4, 5 or 6 transition metal and/or a metal from the lanthanide and actinide series, U.S. Pat. No, 5,350,723 incorporated herein by reference, preferably the transition metal is of Group 4. Other ligands may be bonded to the transition metal, such as a leaving group, such as but not limited to hydrocarbyl, hydrogen, silyl or any other univalent anionic ligand. Non-limiting examples of metallocene catalysts and catalyst systems are discussed in for example, U.S. Pat. Nos. 4,530,914, 4,871,705, 4,937,299, 5,124,418, 5,017,714, 5,120,867, 5,278,264, 5,278,119, 5,304,614, 5,324,800 all of which are herein fully incorporated by reference. Also, the disclosures of EP-A-0 591 756, EP-A-0 520 732, EP-A-0 420 436, WO 91/04257 WO 92/00333, WO 93/08221, and WO 93/08199 are all fully incorporated herein by reference.

Further, the metallocene catalyst component of the invention can be a monocyclopentadienyl heteroatom containing compound. This heteroatom is activated by either an alumoxane, an ionizing activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,198,401, 5,227,440 and 5,264,405 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal or can be a bimetallic transition metal compound. Additionally it is within the scope of this invention that the metallocene catalysts and catalyst systems may be those described in U.S. Pat. Nos. 5,064,802, 5,145,819, 5,149,819, 5,243,001, 5,239,022, 5,276,208, 5,296,434, 5,321,106, 5,329,031, 5,346,925 and 5,304,614, PCT publications WO 93/08221 and WO 93/08199 and EP-A-0 578 838 all of which are herein incorporated by reference.

The preferred transition metal component of the catalyst of the invention are those of Group 4, particularly, zirconium, titanium and hafnium. The transition metal may be in any oxidation state, preferably +3 or +4 or a mixture thereof.

For the purposes of this patent specification the term "metallocene catalyst" is defined to contain at least one metallocene catalyst component containing one or more cyclopentadienyl moiety in combination with a transition metal. In one embodiment the metallocene catalyst component is represented by the general formula $(C_p)_m MR_n R'_p$ wherein at least one $C_p$ is an unsubstituted or, preferably, at least one Cp is a substituted cyclopentadienyl ring or cyclopentadienyl moiety, symmetrical or unsymetrically substituted; M is a Group 4, 5 or 6 transition metal; R and R' are independently selected halogen, hydrocarbyl group, silyl containing hydrocarbyl or hydrocarboxyl groups having 1–20 carbon atoms or combinations thereof; m=1–3, n=0–3, p=0–3, and the sum of m+n+p equals the oxidation state of M, preferably m=2, n=1 and p=1. The Cp can be substituted with a a combination of substituents, which can be the same or different. Non-limiting examples of substituents include hydrogen or a linear, branched or cyclic alkyl, alkenyl or aryl radical having from 1 to 20 carbon atoms. The substituent can also be substituted with hydrogen or a linear, branched or cyclic alkyl, alkenyl or aryl radical having from 1 to 20 carbon atoms. In addition, the Cp can be a substituted or unsubstituted fused ring system such as an indenyl moiety, a benzindenyl moiety, a fluorenyl moiety or the like. Non-limiting examples of fused ring system substituents include linear, branched or cyclic alkyl, alkenyl or aryl radicals and isomers thereof.

In another embodiment the metallocene catalyst component is represented by one of the formulas:

$(C_5R'_m)_p R''_s (C_5R'_m) MQ_{3-p-x}$ and $R''_s (C_5R'_m)_2 MQ'$ wherein M is a Group 4, 5, 6 transition metal, at least one $C_5R'_m$ is a substituted cyclopentadienyl, each R', which can be the same or different is hydrogen, alkyl, alkenyl, aryl, alkylaryl or arylalkyl radical having from 1 to 20 carbon atoms or two or more carbon atoms joined together to form a part of a substituted or unsubstituted ring or ring system having 4 to 20 carbon atoms, R" is one or more of or a combination of a carbon, a germanium, a silicon, a phosphorous or a nitrogen atom containing radical bridging two $(C_5R'_m)$ rings, or bridging one $(C_5R'_m)$ ring to M, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides, Q' is an alkylidene radical having from 1–20 carbon atoms, s is 0 or 1 and when s is 0, m is 5 and p is 0, 1 or 2 and when s is 1, m is 4 and p is 1.

For the purposes of this patent specification and appended claims, the terms "cocatalysts" and "activators" are used interchangeably and are defined to be any compound or component which can activate a metallocene catalyst as defined above, for example, an electron donor or any other compound that can convert a neutral metallocene catalyst component to a metallocene cation. It is within the scope of this invention to use alumoxane as an activator, and/or to also use bulky, compatible ionizing activators, neutral or ionic, or compounds such as tris (di-t-butylmethylsilyl) perfluorophenyl) boron, tri (n-butyl) ammonium tetra kis (pentaflurophenyl) boron or trisperfluorophenylboron or any other highly fluorinated trisarylboron metalloid precursor, which ionize the neutral metallocene compound and stabilize the resulting metallocene cation.

There are a variety of methods for preparing alumoxane, non-limiting examples of which are described in U.S. Pat. No. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, all of which are fully incorporated herein by reference.

Ionizing compounds or non-coordinating anions may contain an active proton, or some other cation associated with but not coordinated or only loosely coordinated to the remaining ion of the ionizing compound. Such compounds and the like are described in EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,278,119 and U.S. patent application Ser. No. 08/285,380, filed Aug. 3, 1994 and are all herein fully incorporated by reference. Combinations of activators are also contemplated by the invention, for example, alumoxanes and ionizing activators in combinations, see for example, WO 94/07928.

In an embodiment of the invention two or more metallocene catalyst components as describe above can be combined to form a catalyst system useful in the invention. For example, those mixed catalysts described in U.S. Pat. No. 5,281,679 and U.S application Ser. No. 138,818 filed Oct. 14, 1993 both of which are fully incorporated herein by reference. In another embodiment, metallocene catalyst components can be combined to form the blend compositions as described in PCT publication WO 90/03414 published Apr. 5, 1990, fully incorporated herein by reference. In yet another embodiment mixed metallocenes as described in U.S. Pat. Nos. 4,937,299 and 4,935,474, both are herein fully incorporated herein by reference, can be used to produce polymers having a broad molecular weight distribution and/or a multimodal molecular weight distribution. In another embodiment of the invention at least one metallocene catalyst can be combined with a non-metallocene or traditional Ziegler-Natta catalyst or catalyst system, non-limiting examples are described in U.S. Pat. Nos. 4,701,432, 5,124,418, 5,077,255 and 5,183,867 all of which are incorporated herein by reference.

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene or polystyrene divinyl benzene polyolefins or polymeric compounds or any other organic support material and the like, or mixtures thereof.

The preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention has a surface area in the range of from about 10 to about 700 $m^2/g$, pore volume in the range of from about 0.1 to about 4.0 cc/g and average particle size in the range of from about 10 to about 500 $\mu$m. More preferably, the surface area is in the range of from about 50 to about 500 $m^2/g$, pore volume of from about 0.5 to about 3.5 cc/g and average particle size of from about 20 to about 200 $\mu$m. Most preferably the surface area range is from about 100 to about 400 $m^2/g$, pore volume from about 0.8 to about 3.0 cc/g and average particle size is from about 10 to about 100 $\mu$m. The pore size of the carrier of the invention typically has pore size in the range of from 10 to 1000 Å, preferably 50 to about 500 Å, and most preferably 75 to about 350 Å.

Other non-limiting examples of carriers are described in U.S. Pat. Nos. 5,346,925 and 5,362,824, both are fully incorporated herein by reference, which discuss organic porous polymer supports and carriers such a styrene and divinyl benzene.

Methods of Producing the Catalyst System of the Invention

The catalyst system of the invention can be made in a variety of different ways. Examples of supporting the catalyst system used in the invention are described in U.S. Pat. Nos. 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, 5,346,925 and U.S. patent application Ser. Nos. 138,818, filed Oct. 14, 1993, 170,108, filed Dec. 20, 1993, 182,244, filed Jan. 14, 1994, 233,668, filed Apr. 26, 1994, 265,533, filed Jun. 24, 1994, 265,532, filed Jun. 24, 1994, 271,598, filed Jul. 7, 1994, 287,327, filed Aug. 8, 1994, all of which are herein incorporated by reference. In a preferred embodiment, the invention relates to forming in a vacuum or in an environment above ambient pressure any one of these non-limiting examples for forming a supported catalyst system, and in an alternate embodiment of the invention, the pressure is subsequently increased.

For the purposes of this patent specification and appended claims the term "vacuum" means a condition below ambient pressure. Preferably the pressure is in the range from less than 1 atm to $10^{-4}$ atm, more preferably in the range of from about 0.7 atm to about 0.001 atm, and most preferably 0.5 atm to about 0.01 atm.

The supported catalyst of the invention is typically produced in a vessel, container, tank or the like. The size of the vessel or the like is irrelevant and depends on the quantity of catalyst to be produced. The vessel can be as small as a vial (10 ml) or as large as a tank having a volume greater than 1000 liters. For the purposes of this patent application and appended claims a "vessel" includes any apparatus or equipment suitable for the preparation of catalyst that can be evacuated to form a vacuum within or maintain a desired pressure within. In an embodiment the vessel contains an inert gas, such as nitrogen that is non-reactive with any of the components of the supported catalyst system.

In a preferred embodiment of the invention the vessel is depressurized prior to the introduction of the carrier. In the most preferred embodiment, the vessel containing a carrier is depressurized.

For the purposes of this patent specification and appended claims the terms "depressurize", "depressurized" and "depressurizing" and the like means that the pressure is decreased from a starting pressure.

In an alternative embodiment, the supported catalyst system of the invention is produced by increasing the pressure within a vessel during or after contacting a carrier with a liquid. The liquid could contain one or more of a least one metallocene catalyst component and a least one activator, it could contain a traditional Ziegler-Natta catalyst or a surface modifier or an antistatic agent or a combination or mixture thereof. It is also contemplated that the liquid could be a mixture of different liquids. It is further contemplated that a first liquid containing a metallocene catalyst component and second liquid containing an activator are precombined to form a mixture prior to contacting with a carrier or the first liquid and second liquids are contacted separately with the carrier or could be contacted in an alternating or simultaneous or proportionate or disproportionate fashion with carrier.

For the purpose of this patent specification and appended claims the terms "pressurize", "pressurized", and "pressurizing" and the like means that the pressure is increased from a starting pressure.

In an embodiment, in preparing the supported catalyst system of the invention, the starting pressure of the vessel is in the range of from about 0.00001 atm to a pressure at which a gas would liquefy, preferably the starting pressure is in the range of from about 0.001 atm to about 50 atm, more preferably in the range from about 0.001 atm to about 20 atm, and most preferably in the range of about 0.01 to about 10 atm.

In another embodiment, the pressure of the vessel is preferably reduced to less than ambient pressure prior to the formation of the supported catalyst system of the invention. "Ambient pressure" is atmospheric pressure.

In one embodiment the starting pressure of the vessel is less than 1 atmosphere to about $10^{-4}$ atmospheres, preferably less than 0.95 atm, more preferably less than 0.8 atm, even more preferably less than 0.7 atm, still more preferably less than 0.6 atm and most preferably less than 0.5 atm.

In one embodiment, at least one metallocene catalyst component, at least one activator, at least one carrier component are introduced into a depressurized vessel or a pressurized vessel.

In another embodiment of the invention, the metallocene catalyst component and the activator are combined to form a solution. In a preferred embodiment the solution is added to the depressurized vessel containing a carrier.

The most preferred method for producing the catalyst of the invention, is described below and can be found in U.S.

application Ser. Nos. 265,533, filed Jun. 24, 1994 and 265,532, filed Jun. 24, 1994, both are herein fully incorporated by reference in their entirety. In this embodiment, the metallocene catalyst component is typically slurried or dissolved in a liquid to form a metallocene solution and a separate solution is formed containing an activator. The liquid can be any compatible solvent or other liquid capable of forming a solution or the like with at least one metallocene catalyst component and/or at least one activator. In a preferred embodiment the liquid is a cyclic aliphatic or aromatic hydrocarbon, most preferably toluene. The metallocene and activator solutions are preferably mixed together and added to a depressurized vessel containing a porous support such that the total volume of the metallocene solution and the activator solution or the metallocene and activator solution is less than five times the pore volume of the porous support, more preferably less than four times. Preferably, the range for the total volume of the metallocene solution and activator solution or the metallocene/activator solution added to the porous support is between about 0.8 to about 5 times, preferably about 1 times to about 3 times, even more preferably greater than 1 times to about 2.5 times the pore volume of the porous support.

The procedure for measuring the total pore volume of a porous support is well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration*, Vol. 28, No. 3, Analytical Chemistry 332–334 (March, 1956).

In one embodiment of the invention an activator is contacted with the carrier to form a supported activator, which is then placed into a vessel that is then depressurized or a depressurized vessel or a pressurized vessel or pressurized prior to the introduction of at least the metallocene catalyst component. In one embodiment, the supported activator is produced by contacting an organometallic compound, such as trimethylaluminum with an inorganic carrier, such as silica containing water, absorbed or adsorbed, within the carrier to form the supported activator, alumoxane for example.

Non-limiting other components that can included as part of the supported catalyst system of the invention include, for example, surface modifiers, see U.S. application Ser. No. 08/322,675, filed Oct. 13, 1994, antistatic agents, see U.S. Pat. No. 5,238,278, low molecular weight liquid polymers, non-metallocene or traditional Ziegler-Natta or Phillips-type catalysts or combinations thereof.

In another embodiment, the metallocene catalyst component is supported on a first carrier and the activator is supported on a second carrier as described in U.S. application Ser. No. 138,818 filed Oct. 14, 1993. In this embodiment, the metallocene catalyst component is added to a depressurized vessel containing the first carrier, which is then pressurized to form a supported metallocene catalyst component, and separately, the activator is added to a depressurized vessel containing another carrier to form a supported activator. After the vessels have been pressurized the supported metallocene catalyst component and supported activator are added to the reactor together or apart. It is within the scope of the invention that only one of the vessels, for example the vessel containing the supported activator, is pressurized and its contents introduced into the other depressurized vessel, and then, this depressurized vessel is pressurized. It is contemplated that pressurized vessels can also be used to produce the catalyst of this embodiment.

It is within the scope of this invention that where the pressure in the vessel is increased to above ambient pressure that the vessel can subsequently be depressurized to below ambient pressure or vice-versa.

In the preferred embodiment, after the supported catalyst system is prepared by any of the above procedures, the vessel containing the supported catalyst system is preferably pressurized or depressurized to atmospheric pressure for use as a polymerization catalyst.

The supported catalyst system may then be washed or washed and dried or slurried or any combination thereof. The preferred method for pressurizing the supported catalyst of the invention is by introducing a inert gas or liquid to the supported catalyst system. An inert gas such a nitrogen is preferred. If a liquid is used it should preferably be one in which the supported catalyst system is substantially insoluble.

It is within the scope of the invention that a monomer or comonomer, such as ethylene or propylene, or even hydrogen can be introduced to pressurize the supported catalyst system.

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3:1.

Polymerization Process of the Invention

The catalyst system of this invention is suited for the polymerization of monomers, optionally with at least one comonomer in any polymerization or prepolymerization process, gas, slurry or solution phase or a high pressure autoclave process. In the preferred embodiment a gas phase or slurry phase process is utilized.

In a preferred embodiment the invention is directed toward the gas phase polymerization reactions involving the polymerization of one or more of the monomers including ethylene and/or alpha-olefin monomers having from 3 to 20 carbon atoms, preferably 3–12 carbon atoms. The invention is particularly well suited to the copolymerization reactions involving the polymerization of one or more of the monomers, for example alpha-olefin monomers of ethylene, propylene, butene-1, pentene-1,4-methylpentene-1, hexene-1, octene-1, decene-1, and cyclic olefins such as cyclopentene, and styrene or a combination thereof. Other monomers can include polar vinyl, diolefins such as dienes, polyenes, norbornene, norbornadiene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms.

In another embodiment ethylene or propylene is polymerized with at least two different comonomers to form a terpolymer and the like, the preferred comonomers are a combination of alpha-olefin monomers having 3 to 10 carbon atoms, more preferably 3 to 8 carbon atoms.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399, 4,588,790, 5,028,670 and 5,352,749 and U.S. application Ser. No. 216,520, filed Mar. 22, 1994, U.S. application Ser. No. 08/306,055 filed Sep. 14, 1994 and U.S. application Ser. No. 08/317,136, filed Oct. 3, 1994 all of which are fully incorporated herein by reference.

In a preferred embodiment of the invention the process is a gas phase polymerization process operating in a condensed mode. For the purposes of this patent specification and appended claims the process of purposefully introducing a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

In another embodiment of the process of the invention a inert hydrocarbon component or antistatic agent as described in U.S. Pat. No. 5,238,278 and U.S. application Ser. No. 08/322,675, filed Oct. 13, 1994 can be introduced into the reactor together, separately or apart, from the catalyst system of the invention.

A slurry polymerization process generally uses pressures in the range of about 1 to about 500 atmospheres or even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be, for example, an alkane or a cycloalkane. The medium employed should be liquid under the conditions of polymerization and relatively inert. Non-limiting examples of liquid mediums include hexane, isobutane or isobutylene.

In one embodiment of the process of the invention, the catalyst system is prepolymerized in the presence of monomers, ethylene and/or an alpha-olefin monomer having 3 to 20 carbon atoms prior to the main polymerization. The prepolymerization can be carried out batchwise or continuously in gas, solution or slurry phase including at elevated pressures. The prepolymerization can take place with any monomer or combination thereof and/or in the presence of any molecular weight controlling agent such as hydrogen. For details on prepolymerization see U.S. Pat. No. 4,923,833 and 4,921,825 and EP-B-0279 863, published Oct. 14, 1992 all of which are incorporated fully herein by reference.

In a preferred embodiment of the process of the invention the process is operated essentially free of a scavenger as is described in U.S. application Ser. No. 08/306,055, filed Sep. 14, 1994. For the purposes of this patent specification and appended claims a "scavenger" is any organometallic compound which is reactive towards oxygen and/or water and/or polar compounds and which does not include the catalyst components of the invention. Non-limiting examples of scavengers can be generally represented by the formula $R_nA$, where A is a Group 12 or 13 element, each R, which can be the same or different, is a substituted or unsubstituted, straight or branched alkyl radical, cyclic hydrocarbyl, alkyl-cyclo hydrocarbyl radicals or an alkoxide radical, where n is 2 or 3. Typical scavengers include trialkylaluminum compounds such as trimethylaluminum, triethylaluminum, tri-isopropyl aluminum, tri-sec-butyl aluminum, tri-t-butyl aluminum triisobutyl aluminum, trialkyl boranes and alkoxides and the like.

Polymer Compositions and Applications

The melt index of the polymers of the invention as measured by ASTM D-1238E are generally in the range of about 0.1 dg/min to about 1000 dg/min, preferably about 0.2 dg/min to about 300 dg/min, more preferably about 0.3 to about 200 dg/min and most preferably about 0.5 dg/min to about 100 dg/min.

The polymer compositions of the invention have a density in the range of from about 0.86 g/cm$^3$ to about 0.97 g/cm$^3$, preferably about 0.88 g/cm$^3$ to about 0.97 g/cm$^3$, more preferably between about 0.90 g/cm$^3$ to about 0.97 g/cm$^3$ and most preferably between about 0.91 g/cm$^3$ to about 0.97 g/cm$^3$.

The MWD of the polymers of the invention are in the range of greater than about 1.8 to about greater than 30, preferably in the range of greater than about 2 to about 50, more preferably in the range of greater than about 3 to 40 and most preferably in the range of 4 to 30.

Another important characteristic of the polymer of the invention is its composition distribution (CD). A measure of composition distribution is the "Composition Distribution Breadth Index" ("CDBI"). CDBI is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions are assumed to have a Mn≧15,000, where Mn is the number average molecular weight fraction. Low weight fractions generally represent a trivial portion of the polymer of the present invention. The remainder of this description and the appended claims maintain this convention of assuming all weight fractions have a Mn≧15,000 in the CDBI measurement.

From the weight fraction versus composition distribution curve the CDBI is determined by establishing what weight percent of the sample has a comonomer content within 25% each side of the median comonomer content. Further details of determining the CDBI of a copolymer are known to those skilled in the art. See, for example, PCT Patent Application WO 93/03093, published Feb. 18, 1993.

The polymers of the present invention can have CDBI's generally in the range of 10 to 99%, preferably greater than 20%, most preferably greater than 30%. In another embodiment the polymers of the invention have a CDBI in the range of greater than 50% to 99%, preferably in the range of 55% to 85%, and more preferably 60% to 80%, even more preferably greater than 60%, still even more preferably greater than 65%. Obviously, higher or lower CDBI's may be obtained using other catalyst systems with changes in the operating conditions of the process employed.

The polymers produced by the process of the invention are useful in such forming operations include film, sheet, and fiber extrusion and coextrusion as well as blow molding, injection molding, sheet thermoforming and rotational molding. Films include blown or cast films in mono-layer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers and toys, etc.

In some instances where it is necessary to improve processability and manipulate final end product characteristics the polymers produced by this present invention can be blended or coextruded into single or multilayer films or the like with various other polymers well known in the art, for instance, LLDPE, LDPE, HDPE, polypropylene, PB, EVA and the like and static controlling agents such as sorbitol.

EXAMPLES

In order to provide a better understanding of the present invention including representative advantages and limitation thereof, the following examples are offered.

Example 1

Into a 150 ml vial equipped with a magnetic stirring bar, 10 g of silica gel dehydrated at 600° C. (D-948 available from W. R. Grace, Davison Chemical Division, Baltimore, Md. with an average particle size of 60 micron) was added. The vial was evacuated under vacuum for 10 min. At the end of vacuum evacuation, the pressure of the vial was reduced to 9 inch Hg (0.33 atm). Into a 50 ml vial, a 0.23 g of (n-BuCp)$_2$ZrCl$_2$ followed by 15 ml of 30 wt % MAO in toluene solution (30 wt % MAO available from Albermarle Corporation, Baton rouge La.) was added. The mixture was stirred at 25° C. for 30 min. The metallocene/MAO mixture was then transferred into the silica containing vial through a syringe while the silica was under constant stir. The total volume of the mixture added was equal to the total pore volume of the silica. The pressure within the vial containing the silica support did not materially increase above its starting point of 0.33 atm. At the end of the addition of the mixture, the vial was pressurized by nitrogen to ambient pressure. The catalyst was then further dried by nitrogen purging followed by vacuum evacuation. A free flowing solid was obtained at the end of the preparation.

Polymerization

Into a clean 2-1 autoclave, a 800 ml of hexane was charged. A 2.0 ml of TIBAL in heptane solution (1.78 mmole Al) was charged into the autoclave. The reactor was heated to 85° C. 125 mg of the catalyst prepared above was then charged into the autoclave through a catalyst injection tube. The catalyst was introduced into the autoclave with ethylene under pressure. The autoclave was pressurized with ethylene to a total pressure of 150 psig (10.2 atm). Ethylene was continuously fed into the autoclave by setting the ethylene feed regulator at 150 psig (10.2 atm). The polymerization was allowed to proceed at 85° C. for 30 minutes. After the polymerization, the polymer slurry was transferred into a evaporation dish. The surface of autoclave wall and agitator was very clean. The product was recovered by letting the solvent evaporate to dryness. A total of 73 g of polymer was obtained.

Example 2

Example 1 was repeated except that an additional 10 ml of toluene was added to the (n-BuCp)$_2$ZrCl$_2$/MAO mixture such that the total volume of the mixture was 1.7 times the total pore volume of the silica. The surface of autoclave wall and agitator was very clean. A total of 93 g polymer was obtained.

Example 3

Example 1 was repeated except that an additional 20 ml of toluene was added to the (n-BuCp)$_2$ZrCl$_2$/MAO mixture such that the total volume of the mixture was 2.3 times the total pore volume of the silica. The surface of autoclave wall and agitator was very clean. A total of 87 g polymer was obtained.

Example 4

Example 1 was repeated except that the silica was not evacuated under vacuum. The surface of autoclave wall and agitator was coated with a polymer film. A total of 76 g of polymer was obtained.

Example 5

Example 2 was repeated except that the silica was not evacuated under vacuum. The surface of autoclave wall and agitator was coated with a polymer film. A total of 110 g of polymer was obtained.

Example 6

Example 3 was repeated except that the silica was not evacuated under vacuum. The surface of autoclave wall and agitator was coated with a polymer film. A total of 17 g of polymer was obtained.

While the present invention has been described and illustrated by reference to particular embodiments, it will be appreciated by those of ordinary skill in the art that the invention lends itself to variations not necessarily illustrated herein. The catalyst of the invention can be used in a single reactor or in a series reactor or even in series where one reactor is a slurry reactor and the other being a gas phase reactor. It is contemplated that the catalyst of the invention can be mixed with a traditional Ziegler-Natta catalyst. For this reason, then, reference should be made solely to the appended claims for purposes of determining the true scope of the present invention.

We claim:

1. A process of polymerizing olefins alone or in combination with one or more other olefins, the process comprising polymerizing in the presence of a supported catalyst system formed by the steps of:

a) introducing a porous inorganic carrier to a vessel having a starting pressure;
b) depressurizing the vessel;
c) introducing into the vessel a solution comprising a metallocene catalyst component and an activator while maintaining the depressurized pressure from step (b);
d) pressurizing the vessel; and
e) recovering the supported catalyst system;
wherein steps (a) and (b) are performed before step (c).

2. The process of claim 1, wherein step (b) is performed prior to step (a).

3. The process of claim 1, wherein the vessel is depressurized to less than 1 atm.

4. The process of claim 1, wherein the vessel is depressurized to less than 0.5 atm.

5. The process of claim 1, wherein the starting pressure is greater than 1 atm.

6. The process of claim 1, wherein step (d) comprises introducing an inert gas into the vessel.

7. The process of claim 1, wherein the vessel in step (d) is pressurized to a pressure of less than 1 atm.

8. The process of claim 1, wherein the metallocene catalyst component is introduced into the vessel prior to the introduction of the activator.

9. The process of claim 1, wherein the method further comprises the step of drying the supported catalyst.

10. The process of claim 1, wherein the carrier contains adsorbed or absorbed water.

11. The process claim 1, wherein the vessel in step (b) is depressurized to below ambient pressure.

12. The process of claim 1, wherein the activator is an alkylalumoxane.

13. The process of claim 1, wherein the metallocene is selected from the group consisting of bridged zirconocenes, unbridged zirconocenes, bridged hafnocenes, and unbridged hafnocenes.

14. The process of claim 12, wherein the mole ratio of alkylalumoxane to metallocene component ranges from 20:1 to 800:1.

15. The process of claim 1, comprising contacting the supported catalyst system with ethylene and alpha-olefin monomers having from 3 to 12 carbon atoms.

16. The process of claim 15, wherein the olefins and supported catalyst system are contacted in a gas phase fluidized bed polymerization reactor.

17. The process of claim 16, wherein a polyolefin is recovered having a density of from 0.86 $g/cm^3$ to 0.97 $g/cm^3$, a melt index of from 0.3 to 200 dg/min, a MWD of from greater than 2 to 50, and a CDBI of greater than 30%.

18. The process of claim 17, wherein the recovered polyolefin is formed into a film.

* * * * *